(12) United States Patent
Conner et al.

(10) Patent No.: US 7,076,830 B2
(45) Date of Patent: Jul. 18, 2006

(54) ELECTRONICALLY COMMUTATED DRIVE SYSTEM FOR VACUUM CLEANER

(75) Inventors: Michael P. Conner, Uniontown, OH (US); Robert N. McKee, Aurora, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 549 days.

(21) Appl. No.: 10/339,122

(22) Filed: Jan. 9, 2003

(65) Prior Publication Data

US 2004/0135537 A1 Jul. 15, 2004

(51) Int. Cl.
*A47L 9/28* (2006.01)

(52) U.S. Cl. ................ 15/339; 15/319; 15/340.1; 180/19.3

(58) Field of Classification Search ........... 15/340.1, 15/340.2, 340.3, 339, 319; 318/138, 254, 318/439, 720–724, 461–464; 180/19.3
See application file for complete search history.

(56) References Cited

U.S. PATENT DOCUMENTS

| | | | |
|---|---|---|---|
| 1,356,663 A | 10/1920 | Spielman | |
| 1,447,814 A | 3/1923 | Paulus | |
| 1,459,946 A | 6/1923 | Camarata et al. | |
| 1,465,285 A | 8/1923 | Peterson | |
| 2,619,209 A | 11/1952 | Horn | |
| 2,814,063 A | 11/1957 | Ripple | |
| 2,950,772 A | 8/1960 | Dostal et al. | |
| 3,218,876 A | 11/1965 | Berger | |
| 3,220,043 A | 11/1965 | Lampe | |
| 3,451,495 A | 6/1969 | Bayless et al. | |
| 3,581,591 A | 6/1971 | Ziegler et al. | |
| 3,618,687 A | 11/1971 | Ripple et al. | |
| 3,823,791 A | 7/1974 | Sheler | |
| 3,854,164 A | 12/1974 | Schmitz | ........... 15/377 |
| 3,896,892 A * | 7/1975 | Kohls et al. | ........... 180/19.3 |
| 3,938,216 A | 2/1976 | Schmitz et al. | |
| 3,942,604 A | 3/1976 | Black III | |
| 4,052,767 A | 10/1977 | Dutcher | |
| 4,111,372 A | 9/1978 | Hicks et al. | |
| 4,249,281 A | 2/1981 | Meyer et al. | ........... 15/410 |

(Continued)

FOREIGN PATENT DOCUMENTS

JP 1-185233 * 7/1989

OTHER PUBLICATIONS

Datasheet High Voltage Monolithic IC, ECN3030F/3031F, pp. 1-7.

*Primary Examiner*—Theresa T. Snider
(74) *Attorney, Agent, or Firm*—Fay, Sharpe, Fagan, Minnich & McKee, LLP

(57) ABSTRACT

A self-propelled appliance, such as a vacuum cleaner includes a magnetic field sensor and magnet. A relative position between the magnetic field sensor and the magnet can be changed by a user of the appliance. The magnetic field sensor generates a signal indicating a magnetic field sensed by the sensor. Therefore, the magnetic field sensor signal indicates the relative position of the magnet to the sensor. This relative position signal is interpreted as a speed and direction request for a means for propelling the appliance. The magnetic filed sensor is, for example, a Hall effect sensor. The means for propelling includes, for example, a brushless d.c motor, sensorless motor or switched reluctance motor. Forward and reverse propulsion is provided without the use of a clutch. The appliance includes a reduced number of wearing components.

32 Claims, 8 Drawing Sheets

U.S. PATENT DOCUMENTS

| | | |
|---|---|---|
| 4,342,369 A | 8/1982 | Ransom |
| 4,347,643 A | 9/1982 | Bair, III |
| 4,434,865 A | 3/1984 | Tschudy et al. |
| 4,615,071 A | 10/1986 | Frohbieter ................ 180/19.3 |
| 4,624,027 A | 11/1986 | Martin ........................ 15/410 |
| 4,766,640 A | 8/1988 | Martin et al. ................. 15/390 |
| 5,042,109 A | 8/1991 | Stephens ..................... 15/354 |
| 5,056,175 A * | 10/1991 | Stein et al. ................... 15/339 |
| 5,077,823 A | 12/1991 | Barry et al. |
| 5,115,537 A | 5/1992 | Meyer et al. ............... 15/340.2 |
| RE34,286 E * | 6/1993 | Toyoshima et al. ........... 15/319 |
| 5,269,042 A | 12/1993 | Stephens et al. .............. 15/356 |
| 5,285,550 A | 2/1994 | Meyer et al. ................. 15/328 |
| 5,335,740 A | 8/1994 | Meyer et al. .............. 180/19.1 |
| 5,339,916 A | 8/1994 | Louis ........................ 180/19.3 |
| 5,406,674 A | 4/1995 | Lawter et al. ............. 15/340.2 |
| 5,455,886 A | 10/1995 | Glenn et al. |
| 5,504,971 A | 4/1996 | McCormick ............... 15/340.2 |
| 5,831,261 A | 11/1998 | Plesko |
| 5,944,635 A | 8/1999 | Butler, Jr. |
| 5,974,622 A | 11/1999 | Louis et al. |
| 6,061,869 A | 5/2000 | Ettes et al. ................. 15/340.2 |
| 6,102,022 A | 8/2000 | Schave |
| 6,108,862 A | 8/2000 | Frederick et al. |
| 6,169,258 B1 | 1/2001 | Roney et al. |
| 6,449,792 B1 | 9/2002 | Myers |
| 6,741,051 B1 | 5/2004 | Chu |
| 2001/0039691 A1 | 11/2001 | Bobrosky et al. |
| 2002/0170137 A1 | 11/2002 | Coates et al. |
| 2004/0134019 A1 | 7/2004 | Cipolla et al. |
| 2004/0134020 A1 | 7/2004 | Conner et al. |
| 2004/0135537 A1 | 7/2004 | Conner et al. |
| 2005/0015918 A1 * | 1/2005 | Rukavina et al. .......... 15/340.2 |
| 2005/0071056 A1 * | 3/2005 | Tondra et al. ................. 701/23 |

* cited by examiner

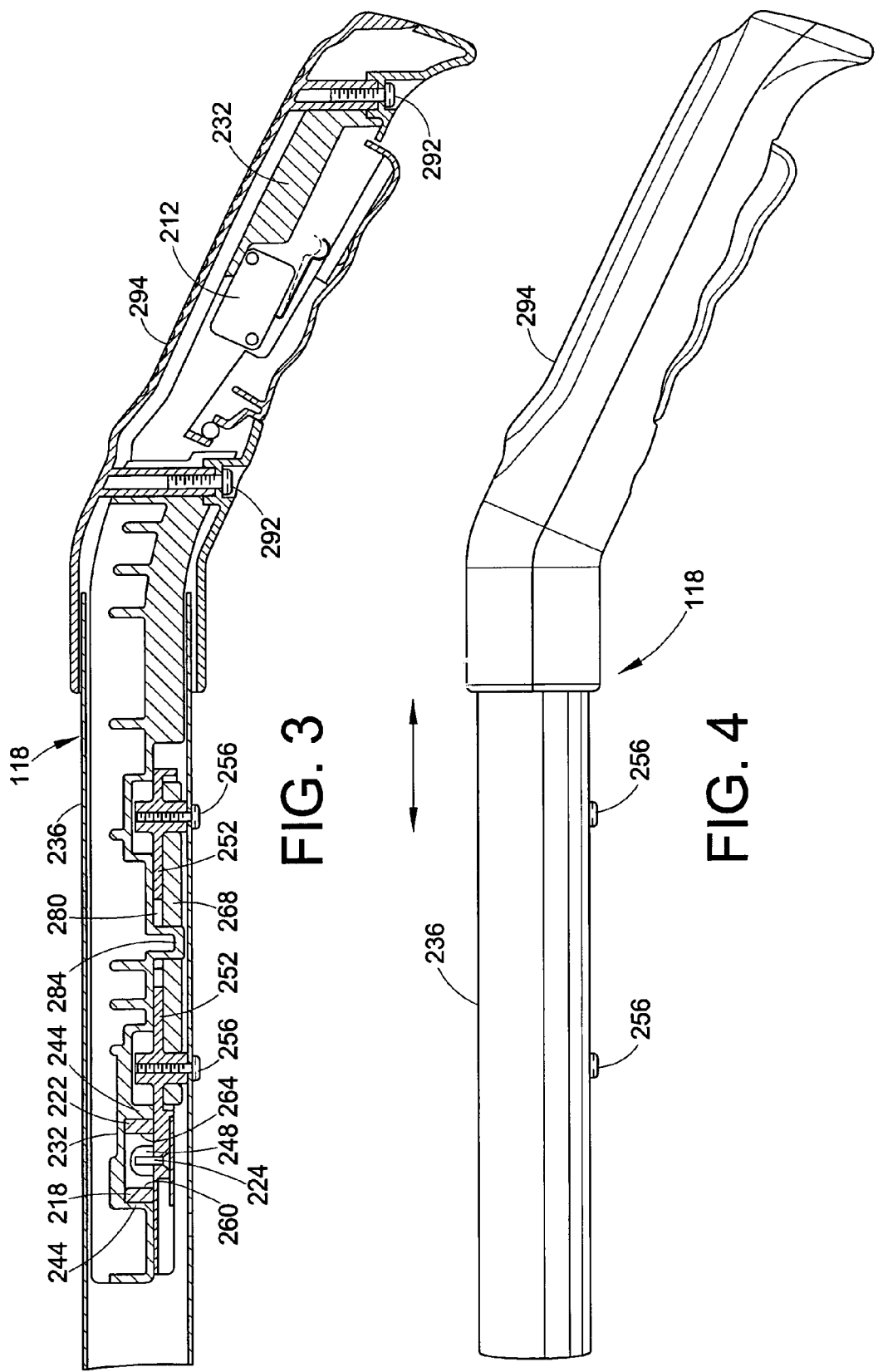

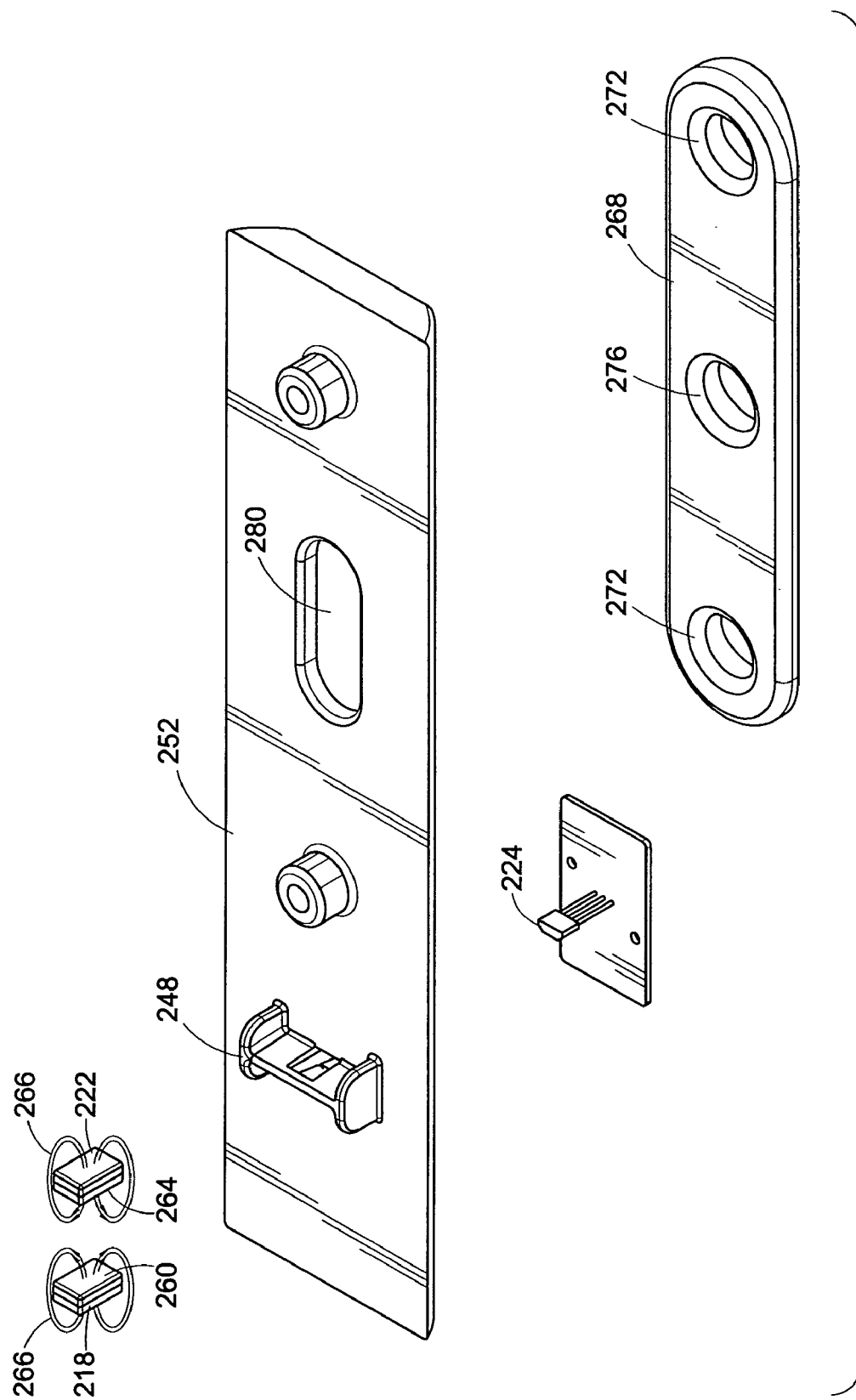

ELECTRONICALLY COMMUTATED DRIVE SYSTEM FOR VACUUM CLEANER

BACKGROUND

The invention is directed toward self-propelled appliances. The invention will be described in reference to a self-propelled vacuum cleaner. However, it should be understood that the invention can be applied in other self-propelled appliances. For example, the invention can be applied in self-propelled shampooers, sweepers, sanders, waxers, and lawn mowers.

Self-propelled appliances, such as, for example, self-propelled vacuum cleaners, include many moving parts. For example many self-propelled vacuum cleaners include mechanically commutated motors to provide propulsion. Mechanically commutated motors include, for example, brushes, which can wear and reduce a useful life of the motor. Additionally, many self-propelled vacuum cleaners require clutches in order to provide forward and reverse gearing. Furthermore, some self-propelled vacuum cleaners include a potentiometer for determining a handle position or other parameter. For instance, movement of a handle controls the position of a slider associated with the potentiometer. The slider, or wiper, rubs against a resistive element as it changes position. This rubbing can lead to the wearing away of the wiper and/or the resistive element.

Each source of wear reduces a mean time between failures of the appliance or vacuum cleaner. Therefore, there is a desire for an appliance or vacuum cleaner having a reduced number of sources of wear.

SUMMARY

A self-propelled appliance with a reduce number of sources of wear has been developed. The appliance includes a base, an electric motor, at least one drive wheel mounted in the base and operatively connected to the electric motor, a controller electrically connected to the electric motor, the controller being operative to drive the electric motor at a plurality of speeds, in a forward direction or a reverse direction, based on at least one signal, and a Hall effect based sensor circuit operative to sense a drive effort desired by a vacuum cleaner user and provide the at least one signal to the controller.

For example, the electric motor can be a brushless d.c. motor, a sensorless motor, a switched reluctance motor or other motor that does not require the use of physical commutation, such as the use of brushes. Depending on the type of motor used, the controller may include a one, two or three phase motor bridge, and a motor or motor bridge controller compatible therewith. The motor controller or motor bridge controller can be an application specific integrated circuit, such as, for example an motor bridge driver IC, or it can be a general purpose device, such as a microprocessor or micro-controller programmed for the purpose of interpreting signals and driving an motor bridge and motor accordingly.

The Hall effect based sensor circuit can include a first magnet, and a Hall effect sensor adjacent the magnet, the magnet and Hall effect sensor being disposed for relative movement therebetween by the vacuum cleaner user. Some embodiments include a second magnet disposed on a side of the Hall effect sensor opposite the first magnet, the magnets having similar magnetic properties and arranged so that a pole of one magnet faces a like pole of the other magnet.

Some embodiments using analog signal processing include a comparator operative to compare a field signal from a Hall effect sensor to a threshold and generate a direction signal based on the comparison.

Some embodiments using analog signal processing include a non-inverting amplifier circuit operative to generate a first speed request signal related to a field signal, at an output of the non-inverting amplifier circuit, when the field signal is within a first range, an inverting amplifier circuit operative to generate a second speed request signal related to the field signal, at an output of the inverting amplifier circuit, when the field signal is within a second range, and a coupling circuit operative to interconnect the output of the non-inverting amplifier and the inverting amplifier and thereby generate a unified speed request signal indicative of the first speed request signal or the second speed request signal depending on whether the field signal is in the first range or the second range.

Where the controller circuit requires separate direction and speed request signals, embodiments include means for extracting requested speed and direction information from measurement of a magnetic field.

Some embodiments include a neutral return spring operative to return a relative spacing between the first magnet and the Hall effect sensor to a neutral distance when the vacuum cleaner user is not effecting relative movement between the first magnet and the second magnet. The neutral return spring can include a polymer spring.

Some embodiments include a soft start circuit. Some embodiments include a high speed/low speed circuit or user selectable gain circuit.

One embodiment is an upright vacuum cleaner. The upright vacuum cleaner includes a nozzle base, an electrically commutated d.c. electric motor, at least one drive wheel mounted in the nozzle base and operatively connected to the d.c. electric motor, a controller connected to the electric motor, the controller being operative to drive the electric motor at a plurality of speeds, in a forward direction or a reverse direction based on a speed signal and a direction signal. To provide the speed signal and the direction signal, the vacuum cleaner includes a first magnet, a second magnet disposed in spaced relation to the first magnet, a pole of the first magnet facing a like pole of the second magnet, a Hall effect sensor disposed between the first magnet and the second magnet, the Hall effect sensor being operative to generate a field signal indicative of a magnetic field at the location of the Hall effect sensor, means for changing a relative position of the magnets and Hall effect sensor, means for generating a speed request signal from the field signal, means for generating a direction signal from the field signal and, means for selectively low pass filtering the speed request signal when it changes to request a higher speed.

In some embodiments the upright vacuum cleaner includes a first mounting structure for supporting the first and second magnets, a second mounting surface for supporting the Hall effect sensor, the first mounting surface being disposed for relative movement in relation to the second mounting surface when an external force is applied to the first mounting surface in a movement direction, and a neutral return spring, for establishing a nominal relative position between the first and second magnets and the Hall effect sensor when an external force is not applied to the first mounting surface in a movement direction.

The means for generating a speed request signal can include a means for providing a dead band in the speed request signal.

In some embodiments the means for generating a speed request signal includes a non-inverting amplifier circuit having a non inverted output, and an inverting amplifier circuit having an inverted output a coupling circuit for combining the non inverting output and the inverting output to generate the speed signal.

The means for selectively low pass filtering the speed request signal can include a buffer amplifier, a resistor having a first terminal and a second terminal, a diode having a first terminal and a second terminal, and a capacitor having a first terminal and a second terminal. For instance, the first terminal of the resistor and the first terminal of the diode are connected to an output of the buffer amplifier, the second terminal of the resistor, the second terminal of the diode, and the first terminal of the capacitor are connected together at an output node, and the second terminal of the capacitor is connected to a reference node.

One aspect of the invention is a method of moving a self driven appliance. The method includes changing a relative distance between a magnet and a magnetic field sensor to indicate a desired motion, measuring a magnetic field at the position of the magnetic field sensor, interpreting the measured magnetic field as a requested speed and direction, and, driving an electronically commutated motor according to the requested speed and direction.

Changing the relative distance between the magnet and magnetic field sensor can include moving a handle element of the appliance attached to one of the magnet and the magnetic field sensor, in a direction of the desired motion.

Measuring a magnetic field can include measuring a Hall effect related to the magnetic field.

Interpreting the measured magnetic field can include calculating a difference between a magnetic field signal and a reference signal, interpreting a magnitude of the difference between the magnetic field signal and the reference signal as a speed request, and, interpreting a sign of the difference between the magnetic field signal and the reference signal as a direction request.

BRIEF DESCRIPTION OF THE DRAWINGS

The invention may take form in various components and arrangements of components, and/or in various procedures and arrangements of procedures. The drawings are only for purposes of illustrating preferred embodiments and are not to be construed as limiting the invention.

FIG. 3 is an elevation view in cutaway, of the portion of the handle of FIG. 2.

FIG. 4 is an elevation view of the portion of the handle of FIG. 2.

FIG. 9 is an enlarged view of a portion of FIG. 2.

DETAILED DESCRIPTION OF THE PREFERRED EMBODIMENTS

Figure 1:
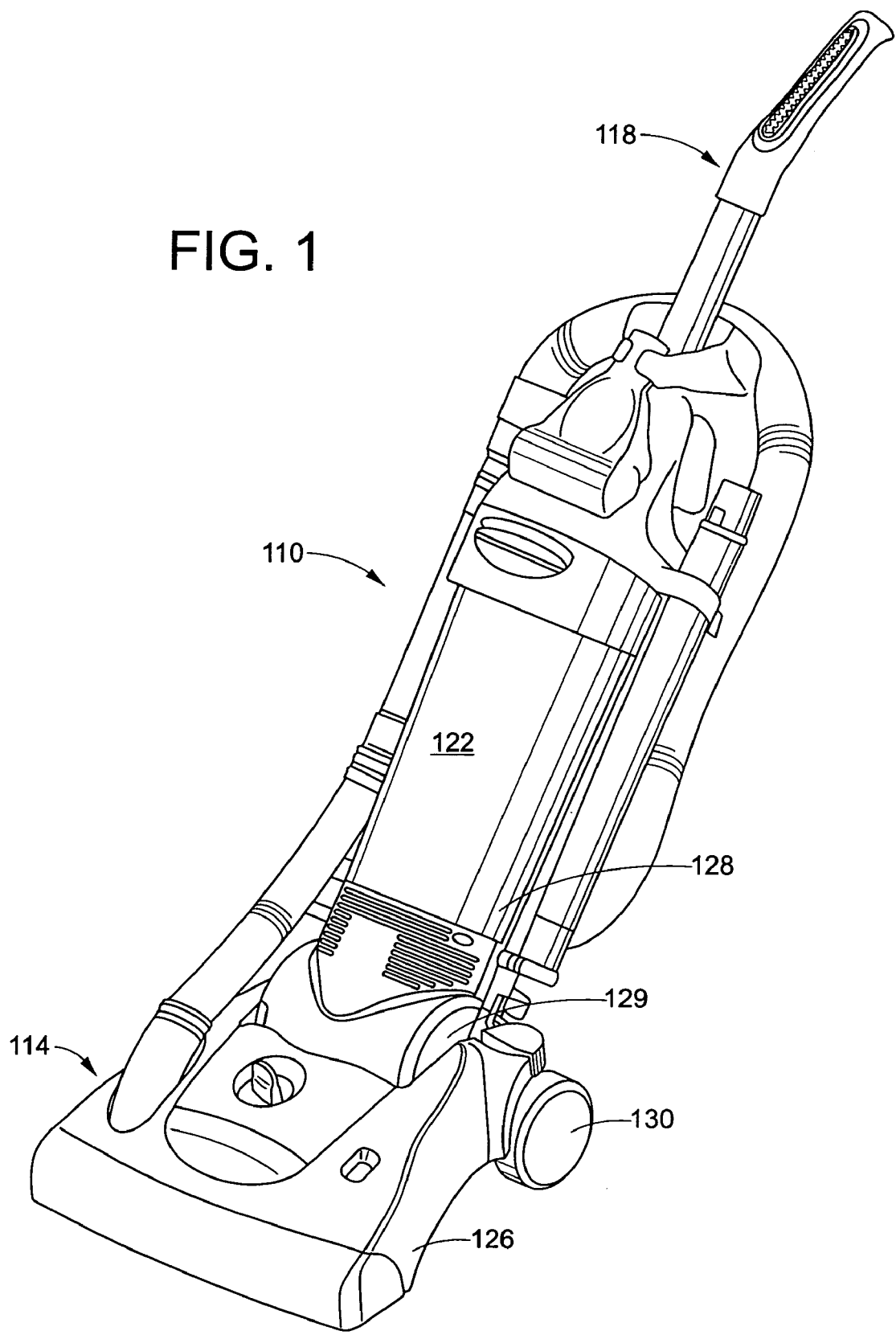
FIG. 1 is a perspective view of an exemplary appliance. The appliance is an upright vacuum cleaner.
Figure 1A:
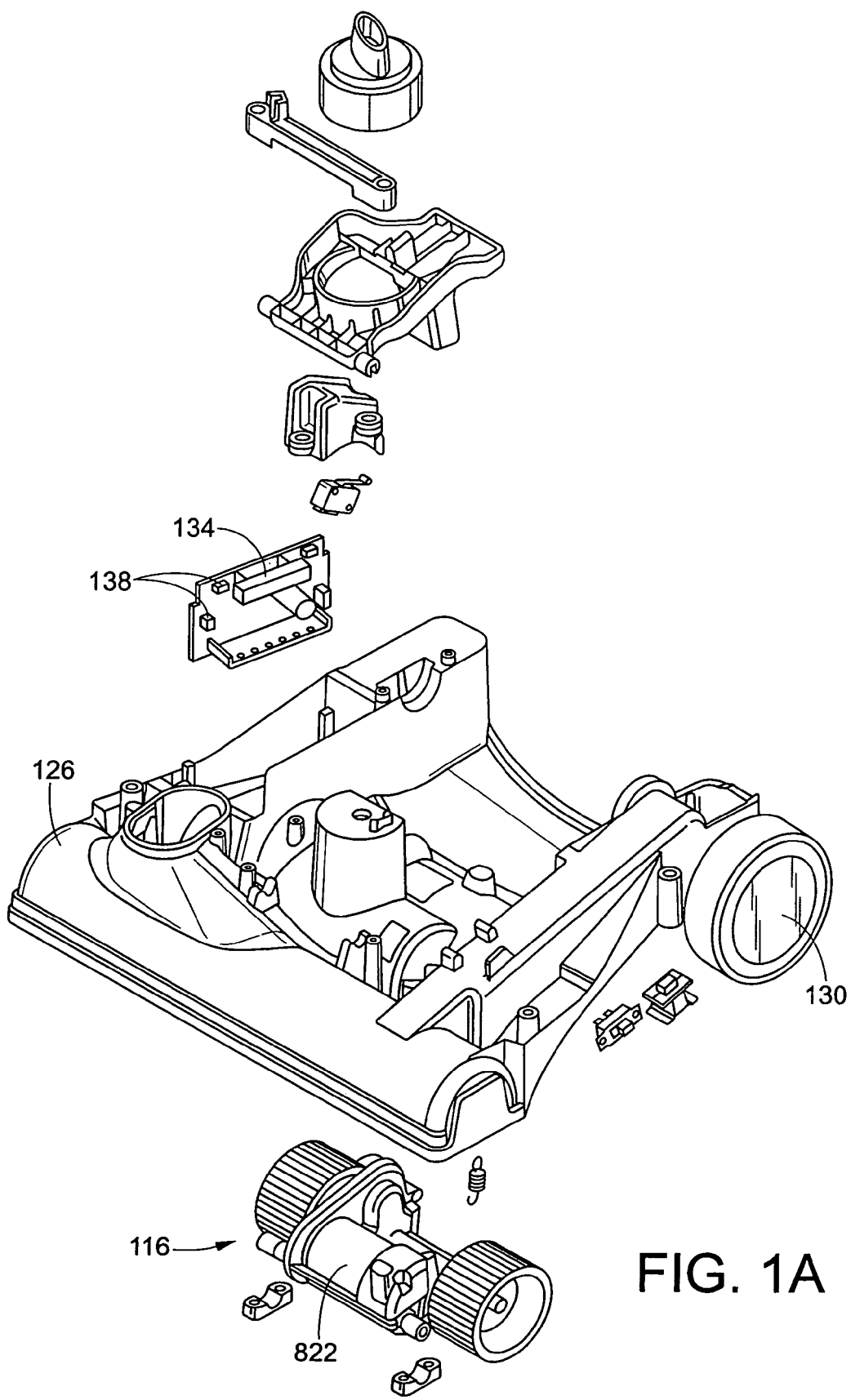
FIG. 1A is an exploded view of a portion of a nozzle base of a vacuum cleaner.

Referring to FIG. 1 and FIG. 1A, a self-propelled appliance 110 includes a base portion 114 and a handle or handle portion 118. Typically, the base portion 114 includes a means 116 for propelling the self-propelled appliance 110. Additionally, the base portion 114 may provide or house implements or actuators for performing the function of the appliance 110. Alternatively, the means 116 for propelling the self-propelled appliance may be associated with some other portion of the appliance 110. For example, the means 116 for propelling might be mounted to a suitably configured handle or upright housing portion of the appliance 110.

For example, where the appliance 110 is a vacuum cleaner 122, the base portion 114 may be a nozzle base 126. In the illustrated embodiment, in addition to housing a means 116 for propulsion, the nozzle base 126 includes a nozzle through which dirt laden air is entrained. Dirt is removed from the air stream and collected in a bag, dirt separation chamber 128, or other portion of the vacuum cleaner 122. Additionally, the nozzle base 126 may include other implements for enhancing the functionality and usability of the vacuum cleaner 122. For example, the nozzle base may house brushes, beater bars and additional wheels 130 for improving the cleaning ability and maneuverability of the vacuum cleaner 122. Furthermore, the nozzle base 126 may house power supplies 134 and control circuitry 138. Alternatively, power supplies and control circuitry may be located in other portions of the vacuum cleaner 122. Similarly, as indicated above, the means 116 for propelling may be associated with some other portion of the vacuum cleaner 122. For example, in a design where an upright housing 128 carries rear wheels of the vacuum cleaner, the means for propulsion 116 could be mounted in a lower portion 129 of the upright housing and coupled to one or more of the rear wheels.

The handle 118 provides a means for an operator to direct the operation of the appliance 110 or vacuum cleaner 122. For example, the handle 118 may be used to steer or direct the appliance 110 or vacuum cleaner 122. Additionally, the handle 118 may include control elements.

Figure 2:
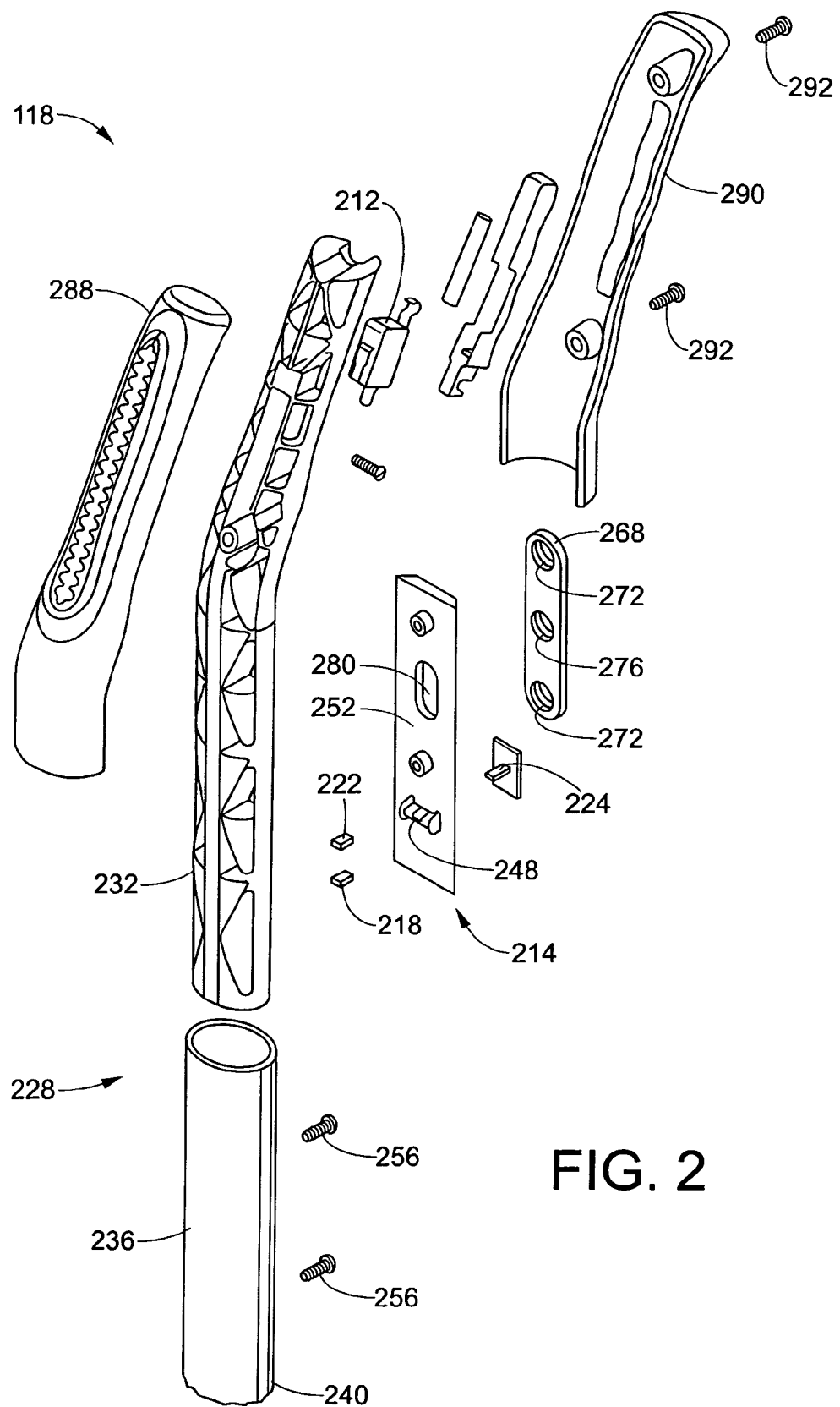
FIG. 2 is an exploded view of a portion of a handle of an appliance.

For example, with reference to FIG. 2, FIG. 3, and FIG. 4, the handle 118 may include an enable switch 212 for providing power or enabling the flow of power to various portions of the appliance or vacuum cleaner 126. For a more detailed description of the enable switch and its control circuitry, reference is made to U.S. patent application Ser. No. 10/339,097 entitled "Control Circuitry for Enabling Drive System for Vacuum Cleaner" filed contemporaneously herewith and incorporated herein by reference. Additionally, the handle 118 may include a means 214 for determining a desired drive effort for the means of self-propulsion. For example, the means 214 for determining a desired drive effort includes a first magnet 218, a second magnet 222 and a means for sensing a magnetic field such as, for example, a Hall effect sensor 224. The handle 118 also includes means 228 for changing a relative position of the magnets and Hall effect sensor. For example, the means 228 for changing the relative position of the magnets 218, 222 and Hall effect sensor 224 includes a first mounting structure 232 and a second mounting structure 236. For instance, the first mounting structure 232 is a latticework or skeleton. The second mounting structure 236 is an upper portion 240 of a handle tube. The first support structure 232 is adapted or sized and shaped to be slidably received within the second mounting structure 236. As best seen in FIG. 3, the magnets 218, 222 are attached to magnet mounting surfaces 244 of the first support structure 232. The Hall effect sensor 224 is housed within and protected by a sensor guard 248 (see also FIG. 9). The sensor guard 248 is mounted on a slide rail 252. The slide rail 252 is secured to an inner wall of the second support structure 236 or the upper portion 240 of the handle tube. For example, the slide rail 252 is secured to the second support structure 236 with fasteners such as screws 256.

Nominally, when assembled, the sensor guard 248 and Hall effect sensor 224 are disposed between like poles of the magnets 218, 222. For example, the sensor guard 248 and Hall effect sensor 224 are situated between a north pole 260 of the first magnet 218 and a north pole 264 of the second magnet 222. This arrangement of the magnets 218, 222 provides a null in a magnetic field between the magnets 218, 222 and magnetic field lines of steadily increasing intensity as a relative position of a measurement point is brought closer to either of the magnets 218, 222. Furthermore, due to this arrangement, lines of force 266 emanating from the like poles 260, 264 are in opposite directions.

The screws 256 also secure a neutral return spring 268 in a position under the slide rail 252. The neutral return spring 268 includes two mounting holes 272 at opposite ends of the spring 268. The neutral return spring 268 also includes a central aperture 276. When the slide rail 252 and neutral return spring 268 are secured to the second mounting surface 236 by the screws 256, the central aperture 276 is aligned with a neutral return slot 280 in the slide rail 252. As best seen in FIG. 3, a neutral return post 284 extends from the first mounting structure 232 through the neutral return slot 280 and into the central aperture 276 of the neutral return spring 268.

As mentioned above, the first mounting structure is adapted to be slidably received within the second mounting structure 236 or upper portion 240 of the handle. The second mounting structure 236 constrains the first mounting structure from lateral or twisting motions. However, the first mounting structure can be slid, within limits, into and out of the second mounting structure 236.

For example, an upper grip 288 and lower grip 290 are secured to the first mounting structure 232 with fasteners or screws 292, thereby forming a user grip 294. A user grasping the user grip 294 may close the enable switch 212 thereby providing power to the rest of the appliance 110 or vacuum cleaner 122 or otherwise enable the operation thereof. Additionally, the user may urge the appliance or vacuum 122 forward or backward by applying pressure to the user grip 294. In so doing, the user would urge the first support structure 232 in a forward or backward direction. This urges the first support structure 232 into or out of the second support structure 236. As the user urges the first support structure 232 into the second support structure 236 or the upper portion 240 of the handle tube, the second magnet 222 is urged closer to the Hall effect sensor 224 and the first magnet 218 is moved further away. The Hall effect sensor 224 senses an increased magnetic field in a first direction and produces an electric signal indicative thereof. Similarly, if the user urges the first support structure out of the second support structure, the second magnet 222 is moved away from the Hall effect sensor 224 and the first magnet 218 is urged toward the Hall effect sensor 224. The Hall effect sensor 224 senses first a reduction in magnetic field strength and then an increase in magnetic field strength in a second direction. The signal generated by the Hall effect sensor 224 changes in concert with these sensed changes in the magnetic field. The user moves the first support structure 232 into or out of the second support structure 236 according to a desired drive effort. Therefore, the signal produced is indicative of a desired drive effort.

As the user urges the first support structure 232 into or out of the second support structure 236, portions of the neutral return spring are compressed while other portions are stretched by movements of the neutral return post 284. Therefore, restorative potential energy is stored in the neutral return spring 268. If the user should release the user grip 294, the energy stored in the neutral return spring 268 returns the neutral return post and, therefore, the first support structure 232 and the magnets 218, 220 to the neutral position.

In the neutral position, the Hall effect sensor 224 is located approximately between the magnets 218, 222 in a null between their respective magnetic fields. The signal from the Hall effect sensor 224 indicates this neutral magnetic field thereby providing an indication that the desired drive effort is zero.

While the neutral return spring 268 in the illustrated embodiment is a polymer spring, the neutral return spring can be other resilient members. For example, a neutral return spring can be fashioned from two wound wire springs joined together to provide a central aperture between them and the loops for receiving the mounting screws 256.

Figure 5:
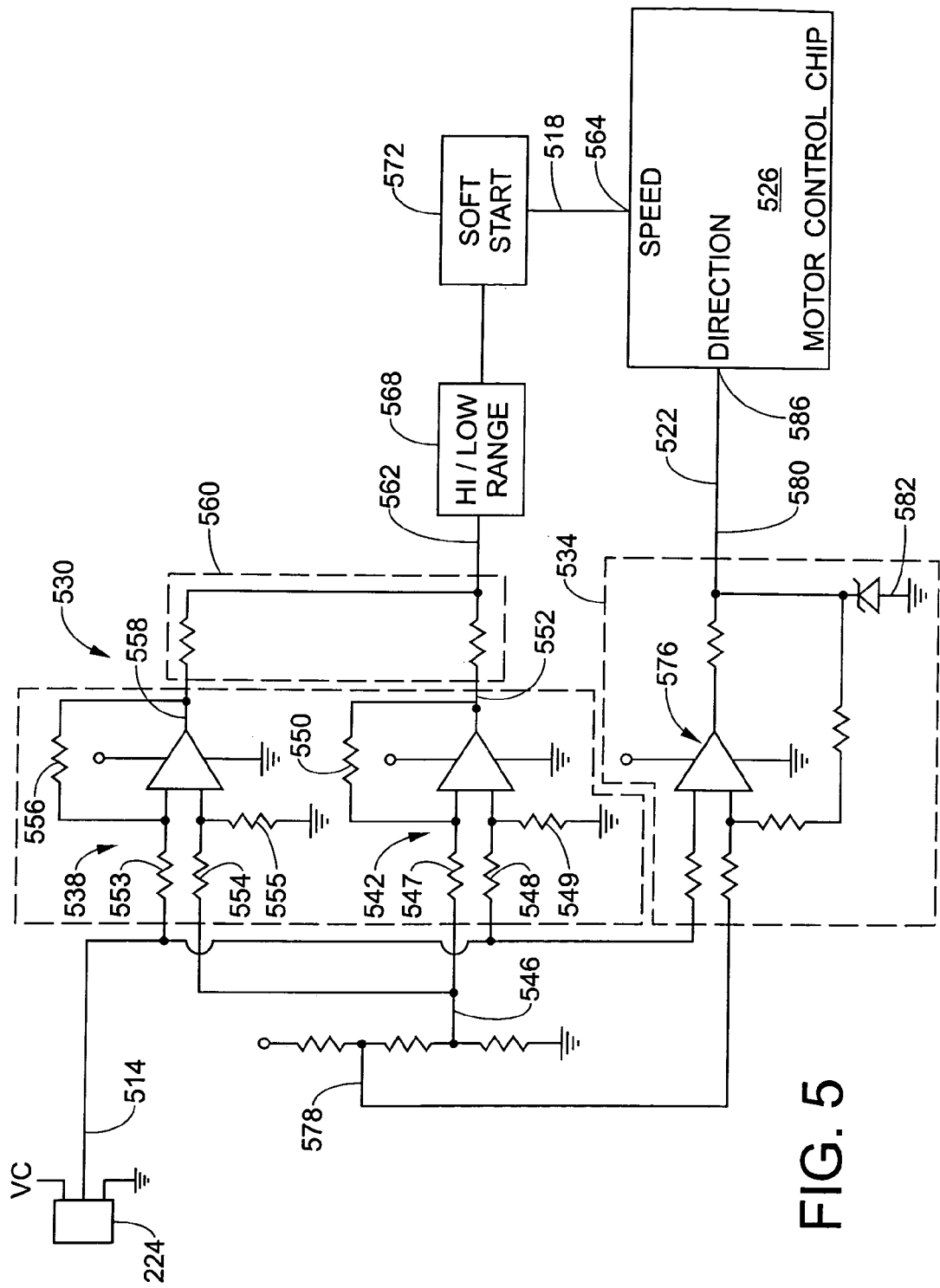
FIG. 5 is a schematic diagram of a signal conditioning or processing circuit operative to extract speed request and direction request information from a magnetic field signal. Other signal conditioning or processing elements are shown in block form.

Referring to FIG. 5, if need be, the signal generated by the Hall effect sensor 224 or field signal 514, can be processed, analyzed or otherwise manipulated to provide signals that are compatible with the means 116 for propelling the appliance or vacuum cleaner. For example, the field signal 514 can be processed or manipulated in order to generate a speed signal 518 and a direction signal 522 that are compatible with an available motor control integrated circuit 526. For instance, the field signal 514 is measured by a means 530 for generating a speed request signal and is measured by a means 534 for generating a direction signal.

The means 530 for generating a speed request signal includes an inverting amplifier circuit 538 and a non-inverting amplifier circuit 542. The amplifier circuits 538, 542 individually compare the field signal 514, or a signal proportional thereto, to a reference signal 546. Components 547–550 associated with the non-inverting amplifier are selected so that when the field signal 514 (or a signal proportional thereto) is within a particular range above the reference signal 546, an output 552 of the non-inverting amplifier 542 is positive and in proportion to a difference between the reference signal 546 and the field signal 514 (or a signal proportional thereto). When the field signal 514 (or a signal proportional thereto) is not within that range above the referenced signal 546, the output of the non-inverting amplifier 542 is substantially zero.

Similarly, components 553–556 associated with the inverting amplifier 538 are selected so that when the field signal 514, or a signal proportional thereto, is in a range below the reference signal 546, an output 558 of the inverting amplifier 538 is positive and proportional to a difference between the reference signal 546 and the field signal 514 (or a signal proportional thereto). When the field signal 514 is not within that range, the output 558 of the inverting amplifier 538 is substantially zero.

The means 530 for generating a speed request signal includes a means 560 for coupling or combining the outputs

552, 558 of the inverting 538 and non-inverting 542 amplifiers thereby creating a unified speed request signal 562.

The range of field signal 514 values for which the output 552 of the non-inverting amplifier 542 is positive, and the range of field signal 514 values for which the output 558 of the inverting amplifier 538 is positive need not overlap or intersect. Indeed, the component values 547–550, 553–556 may be selected so that a dead band exists. That is, the components 547–550, 553–556 may be selected so that there is a range of field signal 514 values for which the outputs 552, 558 of both amplifiers 538, 542 are zero. Such a dead band may be provided in order to prevent the appliance 110 or vacuum cleaner 122 from oscillating between a forward direction and a reverse direction, for example, when a user releases the user grip 294. Additionally, a dead band may provide a window within which the Hall effect sensor 224 or the signal therefrom 514 may drift without adversely affecting the operation of the appliance.

The unified speed request signal 562 may be applied directly to a speed input 564 of the motor control integrated circuit 526. Alternatively, or optionally, the unified speed request signal 562 may be further processed. For example, as will be explained in greater detail below, the unified speed request signal may be further amplified or attenuated in a gain block 568 and/or filtered such as will be described in reference to a soft-start block 572.

The means 534 for generating a direction signal can include, for example, a comparitor circuit 576. For instance, the comparitor circuit 576 compares the field signal 514 to a threshold signal 578. For instance, when the field signal 514 is above the threshold signal 578, an output 580 of the comparitor may be substantially zero. When the field signal 514 is below the threshold 578, the output 580 of the comparitor may be at a positive voltage. For instance, a clamp 582 may limit the output 580 of the comparitor to a voltage within an input range specified for a direction input 586 of the motor control integrated circuit 526. The output 580 of the comparitor is the direction signal 522.

Figure 6:
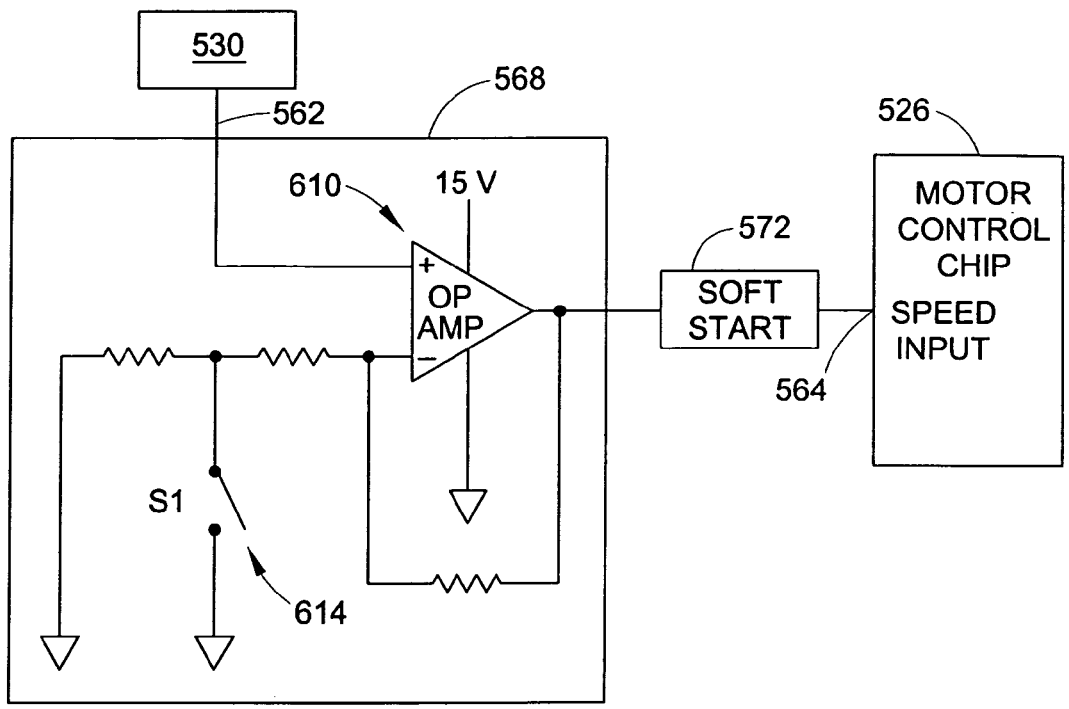
FIG. 6 is a schematic diagram of a user selectable gain block. Other signal conditioning or processing elements are shown in block form.

Referring to FIG. 6, as mentioned above, a speed request signal 562 may be further processed before being delivered to the speed request input 564 of, for example, the motor control integrated circuit 526. For instance, speed signal 562 may be attenuated or amplified depending on the gain of an amplifying or high speed/low speed circuit 568. For example, the high/low speed circuit may include a voltage follower with gain circuit 610. For example, the voltage follower with gain circuit 0.610 may include one or more switches 614 for selecting a desired gain or control feel. For instance, the amplifier circuit 568 may be used to process or condition the speed request signal 562 to be more compatible with the speed input 564 of the motor control integrated circuit 526. Additionally, or alternatively, the amplifier circuit 568 may be used to provide the appliance 110 or vacuum 122 user with a means for varying "a feel" of the appliance. By selecting a gain, for example, with the switch 614, the user affects the overall control loop gain of the means 116 for propelling the vacuum. For example, with a high gain selected, less effort is required from the user (to compress and stretch the neutral return spring) in order to propel the appliance or vacuum 122 at a desired speed. With a lower gain selected, more effort is required of the user. However, some users may appreciate a sensation of increased control that is coincident with the increased user effort. Others may prefer a "feather touch" control of the vacuum provided by the higher gain.

Figure 7:
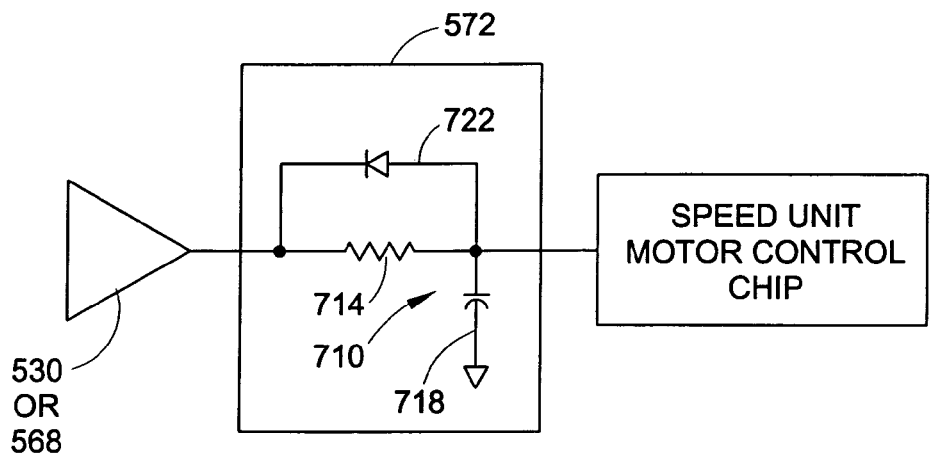
FIG. 7 is a schematic diagram of a soft start circuit. Other signal conditioning or processing elements are shown in block form.

Referring to FIG. 7, as mentioned above, the unified speed signal 562 may be filtered. For example, a soft start circuit 572 may condition the speed request signal to provide a desired system performance. For instance, the speed request signal may be low-pass filtered with, for example, an RC low-pass filter 710, including a resistor 714 and a capacitor 718. For example, the low-pass filter 710 may be included in order to prevent startling jumps when the user first activates the appliance 110 or vacuum 122. Instead, through the use of the low-pass filter 710, the appliance gently accelerates toward a desired speed.

Where the low-pass filter 710 is a simple RC circuit, the resistor 714 may be shunted with a diode 722. Shunting the resistor 714 in this way provides the low-pass filter 710 with two different time constants. For example, where a request for increased speed is represented by an increased voltage, orienting the diode 722, as shown in FIG. 7, allows significant filtering of requests for increased speed. However, when a request for a decrease in speed is made, for example, by the user releasing the user grip 290, the diode 722 acts as a shunt shorting or bypassing the resistor 714 and providing the filter 710 with a much shorter time constant. Therefore, requests to stop are responded to rapidly while requests for increased speed result in a comfortable acceleration.

Figure 8:
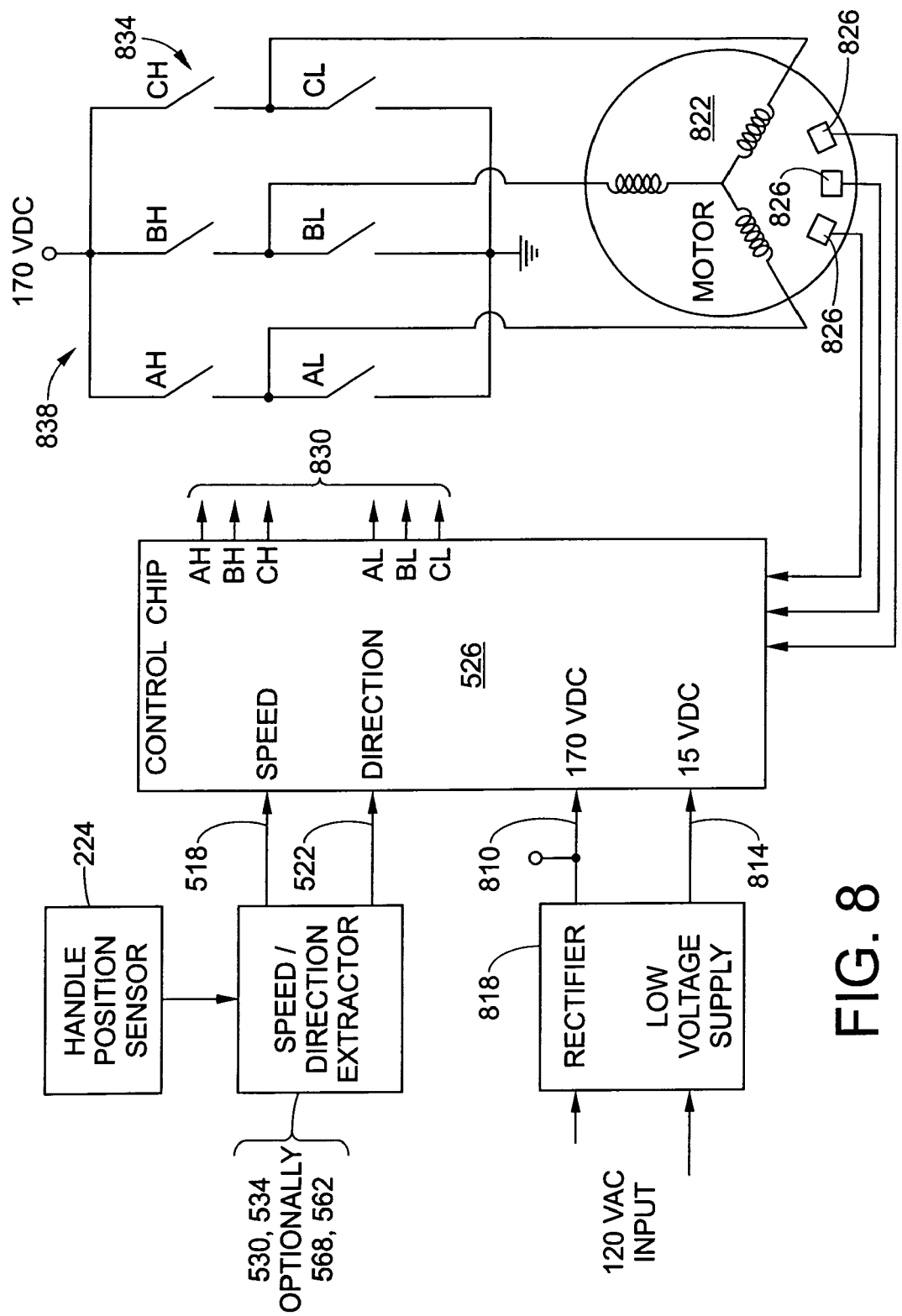
FIG. 8 is a schematic diagram of a motor and motor control system. Other signal conditioning or processing elements are shown in block form.

Referring to FIG. 8, in addition to the speed 518 and direction 522 signals, the motor control integrated circuit 526 receives high-voltage power 810 and low-voltage power 814 from a power supply 818. For example, the power supply 818 receives 120 volts AC from a power line. For instance, the 120 volts AC may be switched through or enabled by the enable switch 212. The power supply 818 may include a rectifier such as a full-wave bridge rectifier and may or may not include filtering to provide a nominal high voltage, such as, for example, 170 volts DC as the high-voltage 810 power. The power supply 818 may also include one or more low-voltage power supplies such as switching power supplies or linear regulators for providing relatively low voltage DC power for control logic within the motor control integrated circuit 526 and for other purposes such as, for example, providing power to the Hall effect sensor 224, the means 530 for generating a speed signal, the means 534 for generating a direction signal, as well as the other amplifiers, filters and references described above.

The motor control integrated circuit 526 also receives inputs from a motor 822 (see also FIG. 1A). For example, the motor control integrated circuit 526 is connected to rotor position sensors 826 within the motor 822. Information received from the rotor position sensors 826 allows the motor control integrated circuit 526 to properly sequence control signals 830 for activating and de-activating electronic switches or transistors 834. For example, the electronic switches 834 are arranged in a three-phase H bridge 838. The H bridge 838 receives power from the high-voltage supply 810. Outputs of the H bridge are connected to motor windings of the motor 822. Properly phased and sequenced switch openings and closings within the H bridge 838 cause current to flow in the motor windings and the generation of rotating magnetic fields that cause a rotor of the motor 822 to rotate.

While the invention is illustrated in terms of a three-phase H bridge, a brushless DC motor and compatible controller IC, other electronically commutated electric motor system combinations are contemplated. For example, one or two-phase motor systems may be used. Alternatively, sensorless motor systems which collect commutation information by measuring a back EMF produced by the motor can be used, as can switched reluctance motor systems. Those of skill in the art will understand that where alternate motor technologies are substituted, compatible electronic switches and controls can be selected. The electronic switches 834 may be, for example, metal oxide field effect transistors (MOSFET), insulated gate bipolar transistors (IGBT) or based on other electronic switch or transistor technologies.

While the illustrated embodiments include analog signal processing, such as, for example, the illustrated means 530 for generating a speed signal, and the illustrated means 534 for generating a direction signal, other signal processing techniques are contemplated. For example, the Hall effect signal may be digitized either within the sensor itself or by an analog-to-digital converter. The digital representation of the field signal may be processed by a microprocessor or micro-controller. The micro-controller may be separate from the motor control integrated circuit, may be part of the motor control integrated circuit or may be a substitute for the motor control integrated circuit. Software stored in a memory associated with the micro-controller or microprocessor may include instructions for extracting speed and direction request information from the Hall effect sensor signal. The microprocessor or micro-controller may provide that information to a motor control chip in a digital form or may be associated with a digital-to-analog converter which provides the motor control chip with an analog speed signal. Additionally, the microprocessor or micro controller may provide the motor control integrated circuit with a direction request bit. Instructions associated with the microprocessor or micro controller may also provide the function of the gain block 568 and the soft start block 572.

The operation of an exemplary embodiment is now summarized. With the appliance enabled (e.g., enable switch 212 closed), the Hall effect sensor 224 can produce a signal. For example, Hall effect sensors are available that produce signals ranging from 1.3 to 7 volts and 0.5 to 7.5 volts. To keep the explanation simple, the operation of the exemplary embodiment will be described in terms of an idealized Hall effect sensor that produces a signal in the range of, for example, 0 to 7 volts.

When the first support structure is in a neutral position, the output of the Hall effect sensor 224 is approximately 3.5 volts. As a user urges the first support structure 232 forward or into the second support structure 236, the first magnet 218 is moved further away from the Hall effect sensor 224, and the second magnet is moved closer to the Hall effect sensor 224. The signal voltage generated by the Hall effect sensor begins to rise. As it rises above a threshold 578, the means 534 for generating a direction signal or comparitor 576 generates a signal 522 indicating the selection of or a request for a forward direction. However, due to the design of the means for generating a speed signal (the selection of component 547–550, 553–556 values), a dead band is provided, and the amplifiers 538, 542 both generate a zero speed request signal (approximately 0 volts). As the user continues to urge the first support structure 232 forward, the voltage signal generated by the Hall effect sensor 224 continues to rise. As the field signal 514 rises above the reference signal 546 (for example, 4 volts), the output of the non-inverting amplifier 542 begins to rise indicating some relatively slow finite speed request 552. The output 558 of the inverting amplifier 538 is maintained at zero. Therefore, a small current flows from the non-inverting amplifier 542 through resistors of the coupling circuit 560 and the coupling circuit 560 behaves as a voltage divider and producing the unified speed request signal 562. The unified speed request signal 562 may be amplified in the amplifier block 568 (high/low block). Preferably, the soft-start block 572 filters the increased speed request providing a filtered speed request 518 to the motor control IC 526. In response the motor control IC 526 measures the position of the rotor of the motor 822 and begins to properly sequence the control lines 830 to provide power to the motor 822 through the H bridge 838. The motor 822 drives the drive wheels either directly or through speed reduction gears, and the appliance 110 or vacuum cleaner 122 begins to move in the forward direction.

If the user continues to urge the first support structure 232 in the forward direction, the first magnet 218 is moved further away from the Hall effect sensor 224 and the second magnet 222 is moved closer to the Hall effect sensor 224. Therefore, the field signal 514 increases as does the speed request signal at its various stages of processing 552, 562, 518. Again, since the speed request signal is increasing, the soft-start circuit 572 filters-it producing the speed request signal 518 with a slower rate of change. Accordingly, the motor control IC 526 controls the control signals 830 so as to ramp up the speed of the motor 822 at a moderate rate.

If the user decides to reverse the direction of the appliance 110 or vacuum 122 and begins to urge the first support structure 232 backward or out of the second support structure 236, the second magnet 222 will begin to move away from the Hall effect sensor 224, and the first magnet 218 will be moved toward the Hall effect sensor. As a result, the field signal 514 will begin to drop, as will the speed request signals 552, 562. Since the change in the speed request signal 562 is a decrease, the soft-start circuit 572 will not filter the change due to the shunting effect of the diode 722. As a result, the motor control integrated circuit 526 will rapidly slow the motor 822. As the user brings the first support structure 232 past the neutral position, the field signal 514 drops below the threshold 578 and the comparitor circuit 576 changes state to indicate a reverse direction. Note that the comparitor circuit 576 may include positive feedback, thereby creating hysteresis to prevent direction signal 522 oscillation when the field signal 514 is held near the value of the threshold 578 or transitions past it slowly. It should be understood from the explanation above that before the field signal 514 drops below the threshold signal 578, it first reaches a point where the output of the non-inverting amplifier 552, and, therefore, the speed request signal 562 drops to substantially zero. As the user continues to urge the first support structure 232 backward or out of second support structure, the first magnet 218 is brought still closer to the Hall effect sensor 224 and the second magnet 222 is pulled further away. The Hall sensor 224 begins to measure an increase in magnetic field strength. However, the magnetic field is in an opposite direction to that of the field measured when the first support structure 232 was urged in the forward direction. Therefore, the field signal 514 continues to fall when the field signal drops below, for example, 3 volts, the output 558 of the inverting amplifier 538 begins to rise while the output 552 of the non-inverting amplifier 542 is maintained at substantially zero. Once again, the coupling circuit 560 acts as a voltage divider but in the reverse direction. The output of the coupling circuit or the unified speed request signal 562 again begins to rise above zero. It may be amplified by amplification block 568 and filtered (due to its rising nature) by the soft-start circuit 572. As a result, the motor control integrated circuit 526 generates control signals 830 for controlling the motor bridge 838 to a drive the motor 822 in a reverse direction. As the user further withdraws the first support structure 232 from the second support structure 236, the first magnet 218 is brought still closer to the Hall effect sensor 224 and the second magnet 222 is moved further therefrom. The field signal 514 continues to drop, and the speed request signals 555, 552 continue to increase. Therefore, the soft-start circuit 572 continues to provide a filtered speed request signal 518 to the motor control IC 526. Therefore, the speed of the motor 822 is ramped up at a moderate rate until it reaches a speed indicated by the position of the first support structure 232.

If the user should release the user grip 294 and/or otherwise stop urging the first support structure 232 in one direction or the other, the neutral return spring 268 will urge the neutral return post, and, therefore, the first support structure 232 and the magnets 218, 222 it carries, back to a neutral position, and the field signal 514 will return to a level where the outputs 558, 552 of the amplifiers 538, 542 return to zero. As explained above, such a decrease in speed request signal would not be filtered by the soft-start circuit 572, and the motor control IC 526 would control the electronic switches 834 of the H bridge 838 to bring the motor 822 to a relatively rapid stop.

The invention has been described with reference to particular embodiments. Modifications and alterations will occur to others upon reading and understanding the specification. It is intended that all such modifications and alterations are included insofar as they come within the scope of the appended claims or the equivalents thereof.

What is claimed is:

1. A vacuum cleaner comprising:
   an electric motor;
   at least one drive wheel operatively connected to the electric motor;
   a controller electrically connected to the electric motor, the controller being operative to drive the electric motor, in a forward direction or a reverse direction, based on at least one signal, and
   a Hall effect based sensor circuit operative to sense a drive effort desired by a vacuum cleaner user and provide the at least one signal to the controller.

2. The vacuum cleaner of claim 1 wherein the electric motor comprises:
   a brushless d.c. motor.

3. The vacuum cleaner of claim 1 wherein the electric motor comprises:
   a sensorless motor.

4. The vacuum cleaner of claim 1 wherein the electric motor comprises:
   a switched reluctance motor.

5. The vacuum cleaner of claim 1 wherein the controller comprises:
   a three phase motor bridge; and
   a three phase motor bridge motor controller integrated circuit.

6. The vacuum cleaner of claim 5 wherein the three phase motor bridge controller integrated circuit is operative to receive a speed signal and a direction signal.

7. The vacuum cleaner of claim 1 wherein the controller comprises:
   a two phase motor bridge; and
   a two phase motor bridge motor controller integrated circuit.

8. The vacuum cleaner of claim 1 wherein the Hall effect based sensor comprises:
   a first magnet;
   a Hall effect sensor positioned adjacent the magnet, the magnet and Hall effect sensor being disposed for relative movement therebetween by the vacuum cleaner user.

9. The vacuum cleaner of claim 8 further comprising:
   a second magnet disposed on a side of the Hall effect sensor opposite the first magnet, the magnets having similar magnetic properties and arranged so that a pole of one magnet faces a like pole of the other magnet.

10. The vacuum cleaner of claim 1 wherein the Hall effect based sensor circuit comprises:
    a comparator operative to compare a field signal from a Hall effect sensor to a threshold and generate a direction signal based on the comparison.

11. The vacuum cleaner of claim 10 wherein the Hall effect based sensor circuit comprises:
    a non-inverting amplifier circuit operative to generate a first speed request signal related to a field signal, at an output of the non-inverting amplifier circuit, when the field signal is within a first range;
    an inverting amplifier circuit operative to generate a second speed request signal related to the field signal, at an output of the inverting amplifier circuit, when the field signal is within a second range; and,
    a coupling circuit operative to interconnect the output of the non-inverting amplifier and the inverting amplifier and thereby generate a unified speed request signal indicative of the first speed request signal or the second speed request signal depending on whether the field signal is in the first range or the second range.

12. The vacuum cleaner of claim 1 wherein the Hall effect based sensor circuit comprises:
    a non-inverting amplifier circuit operative to generate a first speed request signal related to a field signal, at an output of the non-inverting amplifier circuit, when the field signal is within a first range;
    an inverting amplifier circuit operative to generate a second speed request signal related to the field signal, at an output of the inverting amplifier circuit, when the field signal is within a second range; and,
    a coupling circuit operative to interconnect the output of the non-inverting amplifier and the inverting amplifier and thereby generate a unified speed request signal indicative of the first speed request signal or the second speed request signal depending on whether the field signal is in the first range or the second range.

13. The vacuum cleaner of claim 1 wherein the Hall effect based sensor circuit comprises:
    means for extracting requested speed and direction information from measurement of a magnetic field.

14. The vacuum cleaner of claim 8 further comprising:
    a neutral return spring operative to return a relative spacing between the first magnet and the Hall effect sensor to a neutral distance when the-a vacuum cleaner user is not effecting relative movement between the first magnet and the Hall effect sensor.

15. The vacuum cleaner of claim 14 wherein the neutral return spring comprises a polymer material.

16. The vacuum cleaner of claim 1 wherein the controller comprise a micro-controller.

17. The vacuum cleaner of claim 1 wherein the controller includes a soft start circuit.

18. The vacuum cleaner of claim 17 wherein the controller includes a high speed/low speed circuit for selectively amplifying and/or attenuating a speed request signal.

19. The vacuum cleaner of claim 1 wherein the controller includes a high speed/low speed circuit for selectively amplifying and/or attenuating a speed request signal.

20. An upright vacuum cleaner comprising:
    a nozzle base;
    an upright housing connected to the nozzle base;
    an electrically commutated d.c. electric motor mounted to one of the nozzle base and the upright housing;

at least one drive wheel movably mounted to one of the nozzle base and the upright housing and operatively connected to the d.c. electric motor;

a controller connected to the electric motor, the controller being operative to drive the electric motor, and thereby the at least one drive wheel, at a plurality of speeds, in a forward direction or a reverse direction based on a speed signal and a direction signal;

a first magnet;

a Hall effect sensor disposed adjacent the first magnet, the Hall effect sensor being operative to generate a field signal indicative of a magnetic field at the location of the Hall effect sensor;

means for changing a relative position of the first magnet and Hall effect sensor;

means for generating a speed request signal from the field signal;

means for generating a direction request signal from the field signal;

means for providing the speed request signal to the controller as the speed signal; and means for providing the direction request signal to the controller as the direction signal.

21. The upright vacuum cleaner of claim 20 wherein the means for changing a relative position of the magnets and Hall effect sensor comprises:

a first mounting structure for supporting the first and second magnets;

a second mounting structure for supporting the Hall effect sensor, the first mounting structure being disposed for relative movement in relation to the second mounting structure when an external force is applied to the first mounting surface in a movement direction; and, a neutral return spring, for establishing a nominal relative position between the first and second magnets and the Hall effect sensor when an external force is not applied to the first mounting surface in a movement direction, the first mounting structure and the second mounting structure each being mounted to one of the upright housing and the nozzle base and the neutral return spring being operatively mounted between the first and second mounting structure.

22. The upright vacuum cleaner of claim 21 wherein the neutral return spring comprises:

a polymer material.

23. The upright vacuum cleaner of claim 20 wherein the means for generating a speed request signal further comprises:

a means for providing a deadband in the speed request signal.

24. The upright vacuum cleaner of claim 23 wherein the means for generating a speed request signal and means for providing a deadband comprise:

a non inverting amplifier circuit operative to provide a non inverted output based on the field signal and a reference signal;

an inverting amplifier circuit operative to provide an inverted output based on the field signal and the reference signal;

a coupling circuit for combining the non inverting output and the inverting output to generate the speed request signal.

25. The upright vacuum cleaner of claim 20 wherein the means for generating a speed request signal comprises:

a non inverting amplifier circuit having a non inverted output;

an inverting amplifier circuit having an inverted output; and, a coupling circuit for combining the non inverting output and the inverting output to generate the speed signal.

26. The upright vacuum cleaner of claim 20 wherein the means for selectively low pass filtering comprises:

a buffer amplifier;

a resistor having a first terminal and a second terminal;

a diode having a first terminal and a second terminal;

a capacitor having a first terminal and a second terminal, wherein the first terminal of the resistor and the first terminal of the diode are connected to an output of the buffer amplifier, the second terminal of the resistor, the second terminal of the diode, and the first terminal of the capacitor are connected together at an output node, and the second terminal of the capacitor is connected to a reference node.

27. The upright vacuum cleaner of claim 20 further comprising:

means for selectively low pass filtering the speed request signal when it changes to request a higher speed, thereby providing a selectively filtered speed request signal; and means for providing the selectively filtered speed request signal to the controller as the speed signal.

28. The upright vacuum cleaner of claim 20 further comprising:

a second magnet disposed in spaced relation to the first magnet, a pole of the first magnet facing a like pole of the second magnet;

wherein the Hall effect sensor is disposed between the first magnet and the second magnet; and wherein the means for changing a relative position of the first magnet and Hall effect sensor comprises means for changing a relative position of the first and second magnets and the Hall effect sensor.

29. A method of moving a self driven vacuum cleaner:

changing a relative distance between a magnet and a magnetic field sensor to indicate a desired motion;

measuring a magnetic field at the position of the magnetic field sensor;

interpreting the measured magnetic field as a requested speed and direction; and, driving an electronically commutated motor according to the requested speed and direction.

30. The method of claim 29 wherein changing the relative distance between the magnet and magnetic field sensor comprises:

moving a handle element of the appliance, attached to one of the magnet and the magnetic field sensor, in a direction of the desired motion.

31. The method of claim 29 wherein measuring a magnetic field comprises:

measuring a Hall effect related to the magnetic field.

32. The method of claim 29 wherein interpreting the measured magnetic field comprises:

calculating a difference between a magnetic field signal and a reference signal;

interpreting a magnitude of the difference between the magnetic field signal and the reference signal as a speed request; and, interpreting a sign of the difference between the magnetic field signal and the reference signal as a direction request.

* * * * *

UNITED STATES PATENT AND TRADEMARK OFFICE
CERTIFICATE OF CORRECTION

PATENT NO. : 7,076,830 B2  Page 1 of 1
APPLICATION NO. : 10/339122
DATED : July 18, 2006
INVENTOR(S) : Conner et al.

It is certified that error appears in the above-identified patent and that said Letters Patent is hereby corrected as shown below:

In the claims:

Column 11, Claim 1, line 2 of the claim, after "comprising:", insert --a nozzle base operatively connected to a suction source;--

Column 11, Claim 1, line 3 of the claim, after "wheel", insert --associated with the nozzle base and--

Column 11, Claim 1, line 10 of the claim, after "user", insert --by sensing one or more aspects of a magnetic field controlled by the vacuum cleaner user--

Column 11, Claim 1, line 10 of the claim, after "and", insert --, based on the sensed desired drive effort--

Column 12, Claim 12, line 4 of the claim, replace "a" with --the--

Column 12, Claim 14, line 4 of the claim, delete (second occurence) "-a"

Column 13, Claim 20, line 9 of the claim, after "motor", insert --operatively connected to a drive wheel of the vacuum cleaner--

Column 13, Claim 20, line 12 of the claim, after "direction", insert --, thereby moving the self driven vacuum cleaner--

Column 14, Claim 30, line 4 of the claim, replace "appliance" with --vacuum cleaner--

Signed and Sealed this

Twenty-ninth Day of December, 2009

David J. Kappos
*Director of the United States Patent and Trademark Office*